United States Patent
Taylor

(10) Patent No.: US 6,202,409 B1
(45) Date of Patent: Mar. 20, 2001

(54) ACOUSTICALLY-ENHANCED INTAKE/EXHAUST SYSTEM AND METHOD FOR INTERNAL COMBUSTION ENGINES

(76) Inventor: Lloyd Taylor, P.O. Box 8, Raleigh, Newfoundland (CA), A0K 4J0

(*) Notice: Subject to any disclaimer, the term of this patent is extended or adjusted under 35 U.S.C. 154(b) by 0 days.

(21) Appl. No.: 09/427,556

(22) Filed: Oct. 26, 1999

(51) Int. Cl.⁷ .................................................. F02B 27/02
(52) U.S. Cl. .............................................. 60/312; 60/314
(58) Field of Search ............................ 60/312, 314, 279

(56) References Cited

U.S. PATENT DOCUMENTS

| | | | |
|---|---|---|---|
| 3,180,077 | * | 4/1965 | Berchtold ................................ 60/314 |
| 3,254,484 | | 6/1966 | Kopper . |
| 3,581,719 | * | 6/1971 | Gau ......................................... 60/279 |
| 3,695,238 | * | 10/1972 | Boerma ................................... 60/314 |
| 4,187,809 | * | 2/1980 | Lanpheer et al. ...................... 60/314 |
| 4,827,880 | | 5/1989 | Ban et al. . |
| 4,835,965 | * | 6/1989 | Poehlman .............................. 60/313 |
| 4,920,745 | * | 5/1990 | Gilbert ................................... 60/314 |
| 5,050,378 | | 9/1991 | Clemmens . |
| 5,060,271 | | 10/1991 | Geddes . |
| 5,101,626 | | 4/1992 | Blair . |
| 5,245,824 | | 9/1993 | Nouis . |

FOREIGN PATENT DOCUMENTS

| | | |
|---|---|---|
| 1032843 | 6/1978 | (CA) . |
| 2362075 | * 6/1974 | (DE) . |
| 273471 A1 | * 11/1989 | (DE) . |
| 54-113715 | * 9/1979 | (JP) . |
| 3-168323 | * 7/1991 | (JP) . |

* cited by examiner

Primary Examiner—Thomas Denion
Assistant Examiner—Tu M. Nguyen
(74) Attorney, Agent, or Firm—Mario Theriault

(57) ABSTRACT

The acoustical system has a sound-producing transducer mounted in the exhaust pipe of the engine, at proximity of the exhaust port and oriented toward the exhaust port, for emitting and directing a sound pulse toward the exhaust port. The sound-producing transducer is operable for bouncing a first sound pulse off the piston wall during the expansion cycle and immediately before opening the exhaust port, for creating a low pressure zone at the exhaust port and for enhancing the evacuation of exhaust gases from the combustion chamber. A second sound pulse is emitted at every compression cycle of the engine and directed at the exhaust port immediately before closing the exhaust port. The combination of the first and second sound pulses at every rotation of the engine provides an efficient scavenging and plugging of the engine for increasing the performance of the engine.

20 Claims, 1 Drawing Sheet

ACOUSTICALLY-ENHANCED INTAKE/EXHAUST SYSTEM AND METHOD FOR INTERNAL COMBUSTION ENGINES

FIELD OF THE INVENTION

This invention pertains to acoustical systems for improving the performance of an internal combustion engine, and more particularly, it pertains to an acoustical system having a single sound-producing transducer mounted in the exhaust passage of an internal combustion engine for influencing the movements of both the intake and exhaust gases within the internal combustion engine.

BACKGROUND OF THE INVENTION

The two-stroke engine is remarkable for its simplicity, for its few moving parts as well as for its reliable construction and operation. Also, its high power to weight ratio makes it ideal for a large number of applications. The structure of this engine is appropriate for the incorporation therein of a multitude of custom-built accessories and for the mounting of the engine in various positions. In the past, the structure of this engine has fascinated many users and challenged the more ingenuous ones to develop performance-enhancing attachments of all sorts.

In regard to the field of the present invention, a number of improvements have been made in the past to influence the movements of gases inside an internal combustion engine. These improvements were designed basically for extracting exhaust gases more efficiently, for reintroducing a nominal quantity of unburnt exhaust gases into the combustion chamber and for compressing an intake charge inside the combustion chamber.

One of the first improvements to the two-cycle engine came in the form of a megaphone or taper pipe mounted on the end of the exhaust pipe. The purpose of this taper pipe is primarily to facilitate the easy exit of burnt gases from the cylinder. Another improvement was obtained when someone placed a reverse megaphone separated by a straight section of pipe in the exhaust system. This particular improvement helped to control the movement of a pressure wave in the exhaust system and to limit the outflow of induced fuel-rich gases through the exhaust port. Since that time, there have been a number of additional improvements made to the taper pipe by changing its length, its cross-section dimensions and the taper angles.

The use of the taper pipe on an exhaust system is also known for improving the efficiency of an engine by timely reflecting a sound wave toward the combustion chamber, thereby stuffing excess air/fuel mixture back into the combustion chamber to be burnt. Depending on the length of the pipe and the temperature of the gasses within the pipe, a manufacturer is able to design an exhaust system for providing maximum power or torque at a specific engine speed (RPM).

However, because of the static nature of the taper pipe concept and the physical constrictions associated with it, it has been difficult in the past to design a system that offers an increase in performance and efficiency over a wide range of operating conditions. It is known for example, that the performance of an engine depends upon the speed of the engine, the degree of opening of the throttle, the speed of sound at various temperatures of the intake/exhaust system, at different atmospheric pressures and at different elevations of the engine. The performance of an engine also depends upon the changes in volume of an exhaust chamber due to build-ups of carbon inside an exhaust pipe, on the wear of an engine or upon other factors of the like.

As such, a number of accessories for improving the performance of internal combustion engines under various operating conditions have been developed in the past and have been used with varying degrees of success. A representative sample of intake/exhaust gases controlling devices of the prior art is explained briefly herein below, and may be better appreciated by reading the following patent documents.

U.S. Pat. No. 3,254,484 issued on Jun. 7, 1966 to John S. Kopper. The system described therein uses sound pressure waves to assist cylinder charging and cylinder scavenging in an internal combustion engine. A first transducer is installed in the intake header and a second transducer is installed in the exhaust header. The transducers are positioned close to the cylinder ports, at right angle with the intake and exhaust passages, and the operation thereof is associated with the intake or exhaust cycle of the engine, for generating sound waves into the exhaust and intake tracts. In order that a pressure wave and a negative pressure pulse arrive at the intake and exhaust ports respectively, at the moment when it will be most beneficial, the intake and exhaust systems have resonating chambers the volumes of which are telescopically adjustable in accordance with variations in engine speed.

U.S. Pat. No. 4,827,880 issued on May 9, 1989 to Masaki Ban et al. This invention relates to a pulsation controller for improving the intake/exhaust systems of internal combustion engines. The controller is connected to sensors for detecting pressure waves travelling in the intake/exhaust systems and has a microprocessor for controlling the timing for opening or closing valves or ports in the intake/exhaust systems according to the phases of these pressure waves, for improving the intake/exhaust efficiencies of the engine.

U.S. Pat. No. 5,050,378 issued on Sep. 24, 1991 to William B. Clemmens. The system described in this document uses the reflected exhaust pressure waves travelling inside the muffler to reintroduce exhaust gases and compress an intake charge into the combustion chamber prior to the compression stroke of the piston. An expansion chamber along the muffler pipe is configured to reflect a sound wave toward the exhaust port. The timing of the wave with the engine speed is done by adjusting the position of a reflection cone inside the expansion chamber, or by injecting fresh air in the exhaust passage to change the temperature of the exhaust gases. The system is believed applicable to engines that are predominantly operated at full power design speed.

U.S. Pat. No. 5,060,271 issued on Oct. 22, 1991 to Earl R. Geddes. This invention comprises a muffler pipe having two transducers and a controller for attenuating the noise of the engine. The transducers are spaced apart and operated in such a way that the sound waves produce a negative pressure at the exhaust port when the exhaust valve opens, to aid the extraction of the combustion gases.

U.S. Pat. No. 5,101,626 issued on Apr. 7, 1992 to Alan J. Blair. The muffler systems described in this document are configured to statically manipulate an acoustical pressure wave produced by the engine to create a negative pressure at the valve port of one piston during its exhaust stroke, and a positive pressure at the port of another piston during its compression stroke.

U.S. Pat. No. 5,245,824 issued on Sep. 21, 1993 to Randy G. Nouis. The document describes a quarter wave tube of optimal length and cross-section area and its placement on a conventional resonant exhaust system to significantly enhance the performance of the engine over a certain range of engine speeds including the peak RPM of the engine.

Canadian Patent 1,032,843 issued on Jun. 13, 1978 to Larry L. Anderson et al. This document describes an exhaust system for an internal combustion engine, and several types of baffle plates positioned in the exhaust pipe for reflecting sound waves travelling in the exhaust pipe, for reducing the effect of these sound waves on the gases in the combustion chamber.

Aside from the invention of Ban et al., the acoustical systems of the prior art are believed to be limited to static systems wherein the efficiency of the engine is directly related to the physical dimensions of a resonating chamber and the wavelength of the sound of an exhaust system. Therefore the efficiencies of the engines using these static acoustical systems are believed to be limited to a narrow range of operating speeds. It is known for example that certain parameters such as gas temperature, needs of the driver or application of the vehicle are subject to change within minutes. Although manufacturers have made every effort to build the best possible systems, the systems of the prior art are believed to be nonetheless a compromise favouring a performance at maximum engine speed over fuel efficiency at common operating conditions.

It is believed that because of the static aspect of exhaust taper pipes, a two-stroke engine having those pipes is efficient over a three to 10 percent of its RPM range. It is further believed that over the remaining ninety to 97 percent of the operating range of an engine, tremendous inefficiencies exist, often caused by the same wave harmonics that created the desired power improvement at higher RPM levels. For the vast majority of engines, except those designed specifically for racing, a great portion of their service life is spent operating at low to medium RPM. It is believed that at lower engine speeds, it is common for sound waves/pulses of an acoustical intake/exhaust system to travel into the combustion chamber, through the transfer port, into the crankcase and out the intake port. This is a tremendous impediment to the flow of gases through the engine.

Therefore, it is believed that a need exists for a better acoustical intake/exhaust system capable of enhancing the efficiency and performance of an internal combustion engine at common engine speeds. It is believed that a need exists for an acoustical intake/exhaust system that is not dependent upon the wavelength of the sound waves in an exhaust system, upon exhaust temperature, atmospheric pressure and upon the shape and dimensions of an exhaust pipe.

SUMMARY OF THE INVENTION

In the present invention, however, there is provided an acoustically-enhanced intake/exhaust system that has all the advantages of the acoustical intake/exhaust systems of the prior art and none of the aforesaid disadvantages.

Broadly, in accordance with one aspect of the present invention, there is provided an internal combustion engine having an acoustical system mounted thereon. The acoustical system comprises a sound-producing transducer mounted in the exhaust pipe of the engine, at proximity of the exhaust port and oriented toward the exhaust port, for emitting and directing a sound wave or a sound pulse toward the exhaust port. The acoustical system also comprises a controller connected to a piston-position sensing means and to the sound-producing transducer for operating the sound-producing transducer according to the timing of the engine.

A primary advantage of the engine of the present invention is that the sound-producing transducer is operable in relation with the position of the piston inside the cylinder of the engine for emitting a sound pulse through the exhaust port, and for reflecting the sound pulse off the piston wall when the piston is moving across the exhaust port. The sound-producing transducer is operable for bouncing a sound pulse off the piston wall during a power stroke and immediately before the piston opens the exhaust port, for creating a low pressure zone at the exhaust port and for enhancing the evacuation of exhaust gases from the combustion chamber immediately as the piston moves pass the exhaust port and opens the exhaust port.

Another advantage of the engine and acoustical system of the present invention is that the sound-producing transducer is also operable for producing another sound pulse when the piston moves up the cylinder during the compression cycle, for emitting and directing the second sound pulse into the exhaust port of the engine, for stuffing unburnt exhaust gases and the induced fuel charge inside the combustion chamber prior to closing the exhaust port and the transfer port of the engine.

In accordance with another aspect of the present invention, there is provided a method for enhancing the performance of an internal combustion engine having a sound-producing transducer mounted in the exhaust pipe thereof, at proximity of the exhaust port and oriented toward the exhaust port. The method comprises the steps of emitting and directing a sound pulse from the sound-producing transducer at every expansion cycle of the engine, through the exhaust port of the engine, when the piston closes the exhaust port. The method also comprises the steps of reflecting the sound pulse off the piston wall and immediately opening the exhaust port. The combustion gases inside the combustion chamber are thereby entrained with the rebound of the sound pulse moving away from the exhaust port along the exhaust pipe.

According to yet another feature of the present invention a second sound pulse is emitted at every compression cycle of the engine and directed at the exhaust port immediately before closing the exhaust port. The combination of the first and second sound pulses at every rotation of the engine provides an efficient scavenging and plugging of the engine for increasing the performance of the engine.

In accordance with yet another aspect of the present invention, the emission of the first and second sound pulses at every rotation of the engine is effected according to the speed of rotation of the engine and the position of the piston inside the cylinder of the engine. The emission of the first and second sound pulses is retarded or advanced according to parameters of operation of the engine, such that the advantages of the acoustical intake/exhaust system of the present invention are obtained under a variety of operating speeds and conditions of the engine.

The acoustical system according to the present invention provides an opportunity to control breathing through an internal combustion engine to a degree believed not heretofore attained. By using inputs from various sensors such as ignition and exhaust temperature, it is believed possible to calculate the precise timing of sound pulses/waves to provide optimum engine efficiency. It is further believed that the timing of sound pulses/waves can be controlled by a pre-determine algorithm, to provide optimum efficiencies from idle speed to the entire RPM range of an engine. It will also be appreciated that the increase in efficiency of two-cycle engine at low and medium RPM, using the acoustical system according to the present invention will result in gain in fuel efficiency, in a reduction in sound emissions, exhaust emissions and less wear in the engine.

It is believed that the designers of two-cycle engines using the acoustical intake/exhaust system according to the present invention will no longer have to worry about sound pulses/waves bouncing throughout the exhaust system causing peaks and valleys in the power/torque curve of the engine and causing performance problems. It is believed that the engines using the acoustical system according to the present invention will have flatter power/torque curves, and therefore much higher power at lower rpms.

The latter point is significant because it is believed that one of the reasons why two-stroke engines have not been widely used in land, snow, air and water vehicles is their lack of low speed torque and low efficiency at speeds below the RPM for which the exhaust system was designed for. As can be appreciated, all present applications of the two-stroke engines, from snowmobiles and motorcycles to outboard motors will benefit immensely from the acoustical intake/exhaust system according to the present invention.

Still another feature of the present invention is that it is susceptible of a low cost of manufacture with regard to materials, equipment and labour, and which accordingly is then susceptible of low price of sale to the industry, thereby making such acoustical intake/exhaust system economically available to the public.

BRIEF DESCRIPTION OF THE DRAWINGS

One embodiment of this invention is illustrated in the accompanying drawings, in which like numerals denote like parts throughout the several views, and in which.

DETAILED DESCRIPTION OF THE PREFERRED EMBODIMENT

Figure 1:
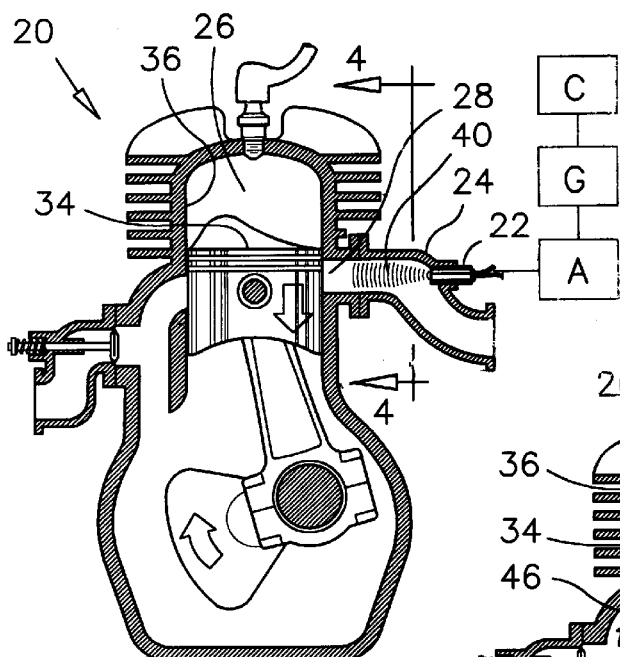
FIG. 1 is a cross-section view of a two-cycle engine showing the piston at an intermediate position along the expansion cycle or power stroke of the engine.
Figure 2:
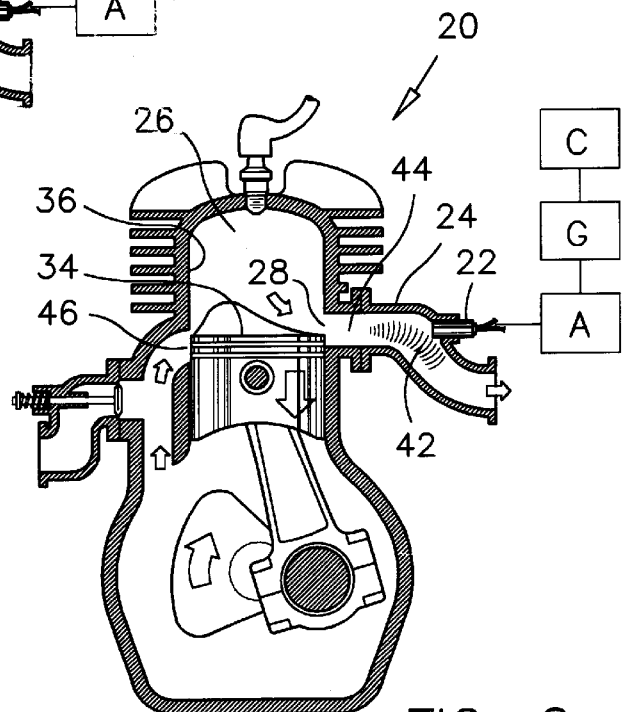
FIG. 2 is a cross-section view of a two-cycle engine as illustrated in FIG. 1, showing the piston moving past the exhaust port during the expansion cycle.

While this invention is susceptible of embodiments in many various forms, there is shown in the drawings and will be described in details herein a specific embodiment, with the understanding that the present disclosure is to be considered as an example of the principles of the invention and is not intended to limit the invention to the embodiment illustrated.

Referring to FIGS. 1–4 the structure and operation of a two-cycle internal combustion engine 20 having an acoustical intake/exhaust system according to the preferred embodiment will be described in details.

Figure 3:
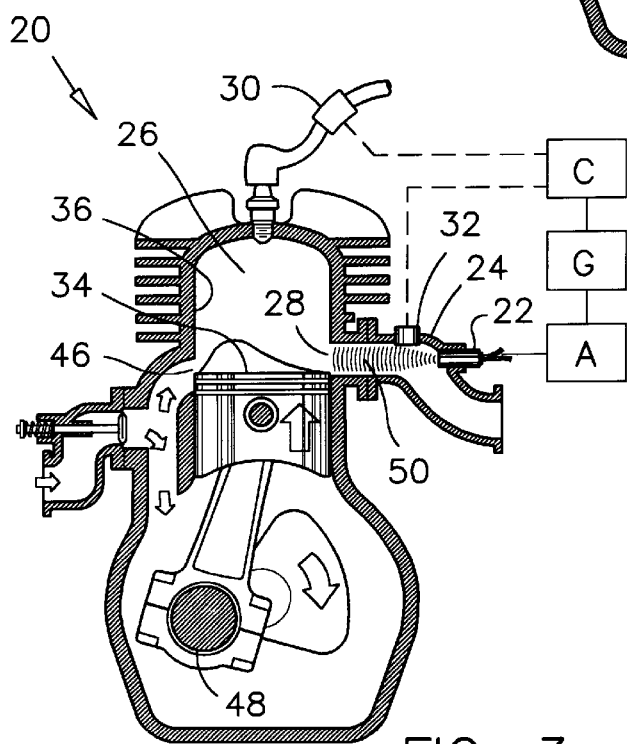
FIG. 3 is a cross-section view of a two-cycle engine as illustrated in FIG. 1, showing the piston starting a compression cycle.
Figure 4:
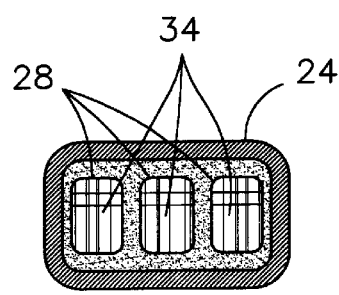
FIG. 4 is a cross-section view through the exhaust header of the engine at the exhaust port of the engine, as seen from a region near line 4—4 in FIG. 1.

The acoustical intake/exhaust system according to the preferred embodiment, often referred to herein as the acoustical system, comprises a sound-producing transducer 22 mounted through the exhaust header or exhaust pipe 24 of the engine, at proximity of the combustion chamber 26. The sound-emission trajectory of the transducer 22 is oriented toward the exhaust port 28 of the combustion chamber 26, and makes substantially a right angle with the longitudinal axis of the cylinder of the engine, as illustrated in FIGS. 1 and 3.

The transducer 22 is mounted at close proximity of the exhaust port such that the transmission of sound between the transducer 22 and the exhaust port 28 is not substantially affected by the temperature of the combustion gases, by the atmospheric pressure, by the elevation of the engine or by similar factors related to the physical properties of an exhaust system. As will be appreciated, the preferred sound-producing transducer 22 is resistant to the heat of an exhaust system and is easily mounted through an aperture through the exhaust pipe 24. These characteristics have not been illustrated in details and are not elaborated upon further for being known to those knowledgeable in automotive sensors and accessories.

The acoustical system according to the preferred embodiment further comprises a controller 'C', a sound generator 'G' and a sound amplifier 'A'. The controller 'C' is preferably connected to the ignition coil (not shown) behind the flywheel (not shown) of the engine 20 or to components of the ignition system for receiving signals from the ignition system and for controlling the operation of the sound-producing transducer 22 according to the timing of the engine. In this respect, an optional sensor includes an ignition sensor 30 mounted to the spark plug cable for monitoring the ignition current to the spark plug of the engine.

Although the controller is preferably connected to the ignition system, it will be appreciated that the purpose of this connection is to monitor a position of the piston inside the cylinder of the engine, and other piston-position sensing means can also be used according to the preference of a user. For example, and without limiting the scope of the invention, it is believed that a piston-position signal can also be obtained from an encoder or other sensor mounted on the crankshaft or on the flywheel of the engine.

Optional sensors also include a temperature sensor 32 mounted to the exhaust header or pipe 24, a RPM sensor (not shown) or other means (not shown) for monitoring other relevant engine parameters. The controller 'C' also preferably includes a timing device for advancing or retarding the emission of sound pulses relative to the signals from the ignition system and to the operating conditions of the engine.

In use, as the top portion of the piston 34, moving down along the engine's cylinder 36 during its power stroke or expansion cycle, approaches the top of the exhaust port 28, a sound pulse/wave 40 is emitted by the transducer 22 located down the exhaust header or pipe 24. This pulse/wave 40 moves rapidly up the pipe 24, reflects of bounces off the piston 34 and heads back down the pipe 24 toward the muffler (not shown). As the rebound 42 of the sound pulse/wave 40 moves away from the exhaust port 28, it creates a low or negative pressure zone 44 behind it at the exhaust port region inside the exhaust header 24. This low or negative pressure zone 44 helps the combustion gases from the combustion chamber to move quickly into the exhaust pipe 24.

The inertia of theses combustion gases helps to pull the air/fuel charge through the transfer port 46 and into the combustion chamber 26 in a short time. The strength of the low or negative pressure on the exhaust gases may be better appreciated by the fact that it has been observed in tests that proper scavenging of the cylinder can result in the air/fuel mixture being pulled into the exhaust system for up to a distance of eighteen inches from the exhaust port 28.

As the crank pin 48 swings past bottom dead center and the piston 34 starts its way back up the cylinder 36, at the appropriate time during the compression cycle, another sound pulse 50 is emitted by the transducer 22. This second sound pulse 50 causes a reversal and compression of the unburnt air/fuel mixture leaving the combustion chamber 26. The mixture is effectively stuffed back into the combustion chamber 26 just before the piston 34 closes the exhaust port 28 and the intake or transfer port 46, providing a supercharging effect and a boost in performance of the engine 20.

All of the above events are controlled by a computer or a microprocessor, which is preferably incorporated within the controller 'C'. The controller 'C', gathers information from sensors such as the temperature sensor 32, and the ignition current sensor 30, or other piston-position sensing means. Depending upon needs, the controller 'C' directs the generator 'G' to generate a signal which is amplified by the amplifier 'A' and sent to the sound-producing transducer 22. As mentioned before, the timing of both sound signals 40 and 50 is preferably tied to the signals generated at the ignition coil (not shown) or at the sensor 30, which is then advanced or retarded as required by the controller 'C' according to operating conditions of the engine.

Although the above description and accompanying illustrations refer specifically to the intake/exhaust system of a two-stroke engine, there are other applications where efficiencies may also be realized. As may be appreciated, the intake side of either a two-stroke or four-stroke engine may benefit from such timed stuffing sound pulses. The exhaust side of the four-stroke engine may also see improvement in efficiencies when equipped with the acoustical system according to the present invention.

It is further believed that the acoustical intake/exhaust system according to the present invention may also be installed on the Wankel or rotary-type engine. It is believed that this latter design has some similarities to that of the two-stroke engine, and that an acoustical intake/exhaust system according to the present invention could provide improvements in power, torque, fuel economy, lower exhaust emission, as well as sound reduction to that type of engine as well.

As to additional details related to the manufacturing, installation and operation of the present invention, the same should be apparent from the above description, and accordingly further discussion relative to the manner of making, installing and using the acoustical intake/exhaust system would be considered redundant and is not provided.

While one embodiment of the present invention has been illustrated and described herein above, it will be appreciated by those skilled in the art that various modifications, alternate constructions, alternate mounting arrangements and equivalents may be employed without departing from the true spirit and scope of the invention. Therefore, the above description and illustrations should not be construed as limiting the scope of the invention which is defined by the appended claims.

I claim:

1. In combination, an internal combustion engine having an ignition system, a cylinder, a piston movably mounted in said cylinder and adapted for movement along said cylinder, a piston-position sensing means associated with said piston for monitoring a position of said piston in said cylinder, an exhaust port through said cylinder at an intermediate region of said cylinder, an exhaust pipe extending from said exhaust port, and an acoustical system mounted on said internal combustion engine for enhancing a performance of said internal combustion engine, said acoustical system comprising:

a sound-producing transducer mounted in said exhaust pipe at proximity of said exhaust port, said sound-producing transducer having a sound-emission trajectory oriented toward said exhaust port and said cylinder, and control means connected to said piston-position sensing means of said internal combustion engine and to said sound-producing transducer for controlling an operation of said sound-producing transducer relative to a timing of said internal combustion engine;

such that said sound-producing transducer is operable for reflecting a sound pulse off said piston when said piston is adapted to be moved across said exhaust port and prior to said piston passing by said exhaust port and opening said exhaust port, for enhancing an evacuation of exhaust gases from said cylinder through said exhaust port.

2. The combination as claimed in claim 1, wherein said control means is connected to said ignition system.

3. The combination as claimed in claim 1, wherein said sound-emission trajectory is oriented at substantially a right angle with an axis of said cylinder.

4. The combination as claimed in claim 3, wherein said control means comprises a controller, a sound generator and a sound amplifier connected to each other and to said sound-producing transducer for controlling an emission of sound pulses from said sound-producing transducer.

5. The combination as claimed in claim 4, wherein said acoustical system further comprises a temperature sensor mounted on said exhaust pipe for controlling an emission of sound pulses from said sound-producing transducer according to a temperature of exhaust gases flowing through said exhaust pipe.

6. A method for enhancing the performance of an internal combustion engine having an ignition system, a cylinder, a piston movably mounted in said cylinder and adapted for movement along said cylinder, a piston-position sensing means associated with said piston for monitoring a position of said piston in said cylinder, an exhaust port through said cylinder in an intermediate region of said cylinder, an exhaust pipe extending from said exhaust port, and a sound-producing transducer mounted in said exhaust pipe at proximity of said exhaust port, said sound-producing transducer having a sound-emission trajectory oriented toward said cylinder and said exhaust port; said method comprising the steps of:

emitting and directing a first sound pulse from said sound-producing transducer toward said cylinder and through said exhaust port when said piston moves over said exhaust port;

reflecting said first sound pulse off of said piston, and immediately opening said exhaust port;

such that exhaust gases inside said cylinder are entrained through said exhaust pipe with a rebound of said first sound pulse.

7. The method as claimed in claim 6, further comprising the additional step of amplifying said first sound pulse.

8. The method as claimed in claim 6, further comprising the step of controlling said step of emitting and directing a first sound pulse from said sound-producing transducer toward said cylinder and through said exhaust port when said piston moves over said exhaust port, according to a temperature of said exhaust gases flowing through said exhaust pipe.

9. The method as claimed in claim 6, wherein said steps of emitting and directing a first sound pulse from said sound-producing transducer toward said cylinder and through said exhaust port when said piston moves over said exhaust port; reflecting said first sound pulse off of said piston; and immediately opening said exhaust port are repeated at every revolution of said engine, during an expansion cycle of said engine.

10. The method as claimed in claim 9, further comprising the step of controlling said step of emitting and directing a first sound pulse from said sound-producing transducer toward said cylinder and through said exhaust port when said piston moves over said exhaust port, according to a timing of said internal combustion engine.

11. The method as claimed in claim 6, further comprising the step of:
emitting and directing a second sound pulse from said sound-producing transducer toward said exhaust port prior to moving said piston over said exhaust port and closing said exhaust port.

12. The method as claimed in claim 11, wherein said step of emitting and directing a second sound pulse from said sound-producing transducer toward said exhaust port prior to moving said piston over said exhaust port and closing said exhaust port is repeated at every revolution of said engine, during a compression cycle of said engine.

13. A method for enhancing the performance of an internal combustion engine having a cylinder, a piston movably mounted in said cylinder and adapted for movement along said cylinder, a piston-position sensing means associated with said piston for monitoring a position of said piston in said cylinder, an exhaust port through said cylinder in an intermediate region of said cylinder for evacuating combustion gases from said cylinder, a transfer port through said cylinder for admitting a fuel mixture into said cylinder, said transfer port being located opposite said exhaust port relative to an axis of said cylinder and an exhaust pipe extending from said exhaust port, said method comprising the steps of:
providing a sound-producing transducer in said exhaust pipe at proximity of said exhaust port and orienting a sound-emission trajectory of said sound-producing transducer toward said exhaust port;
emitting and directing a first sound pulse from said sound-producing transducer through said exhaust port when said piston moves over said exhaust port;
reflecting said first sound pulse off said piston;
immediately opening said exhaust port;
entraining exhaust gases from said cylinder through said exhaust pipe with a rebound of said first sound pulse;
emitting and directing a second sound pulse from said sound-emitting transducer toward said exhaust port, and
immediately closing said exhaust port;
such that said cylinder is efficiently scavenged and stuffed for increasing a performance of said engine.

14. The method as claimed in claim 13, further comprising the additional step of compressing with said second sound pulse, unburnt fuel mixture in said cylinder prior to the step of immediately closing said exhaust port.

15. The method as claimed in claim 13, wherein the step of providing a sound-producing transducer in said exhaust pipe at proximity of said exhaust port and orienting a sound-emission trajectory of said sound-producing transducer toward said exhaust port, comprises the step of aligning said sound-emission trajectory to make substantially a right angle with an axis of said cylinder.

16. The method as claimed in claim 13, wherein said steps of emitting and directing a first and second sound pulses from said sound-producing transducer through said exhaust port are repeated at every rotation of said engine, during an expansion cycle and a compression cycle of said engine, respectively.

17. The method as claimed in claim 16, further comprising the step of controlling said steps of emitting and directing a first and second sound pulses from said sound-producing transducer through said exhaust port according to a speed of rotation of said engine.

18. The method as claimed in claim 17 further comprising the step of amplifying said first and second sound pulses from said sound-producing transducer through said exhaust port.

19. The method as claimed in claim 17, further comprising the step of advancing or retarding said steps of emitting and directing a first and second sound pulses from said sound-producing transducer through said exhaust port, according to operating conditions of said engine.

20. The method as claimed in claim 19, further comprising the step of controlling said steps of emitting and directing a first and second sound pulses from said sound-producing transducer through said exhaust port, according to a temperature of exhaust gases flowing through said exhaust pipe.

* * * * *